April 21, 1931. W. C. FISHER 1,802,243

NARROW INELASTIC LAMINATED FABRIC

Filed Nov. 21, 1927

Inventor:
William C. Fisher
by Chas. F. Randall
atty.

Patented Apr. 21, 1931

1,802,243

UNITED STATES PATENT OFFICE

WILLIAM C. FISHER, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT

NARROW INELASTIC LAMINATED FABRIC

Application filed November 21, 1927. Serial No. 234,637.

The invention has relation to textile fabrics, and in particular to the class known as laminated fabrics, sometimes called compound fabrics. A fabric of such class is characterized by being composed of two or more plies of material, placed together face to face, and having their proximate surfaces maintained in intimate contact with each other by cement or other uniting means.

The invention provides a narrow inelastic laminated fabric of novel construction, admitting of being easily produced in any required width or yardage of any desired materials and appearance, and at relatively low manufacturing cost, and of being produced through the assembling and uniting of the different component elements thereof more expeditiously than goods can be produced in their final shape by usual processes of weaving. The invention lends itself especially to the production of firm, smooth, webbing suitable for use in suspenders, supporters, and the like.

The invention consists in a narrow inelastic fabric comprising an inelastic lining strip, a facing strip cemented to one surface of said inelastic lining strip and having its marginal portions folded inward around the edges of the lining strip and cemented to the other surface of the lining strip, and a backing strip cemented upon the said inwardly folded marginal portions of the facing strip.

An illustrative embodiment of the invention is shown in the accompanying drawings, in which,—

Figure 1:
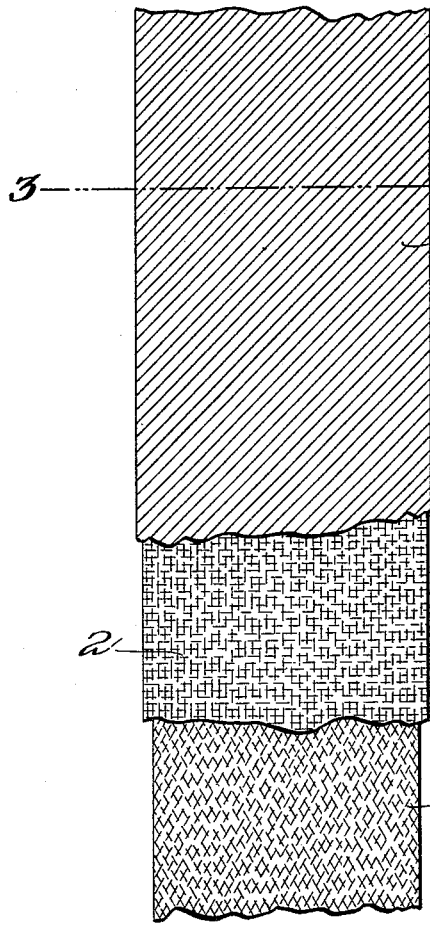
Fig. 1 is a face view of a short length of narrow inelastic suspender material made in accordance with the invention, with portions of two of the layers broken away so as to show the three layers.
Figure 2:
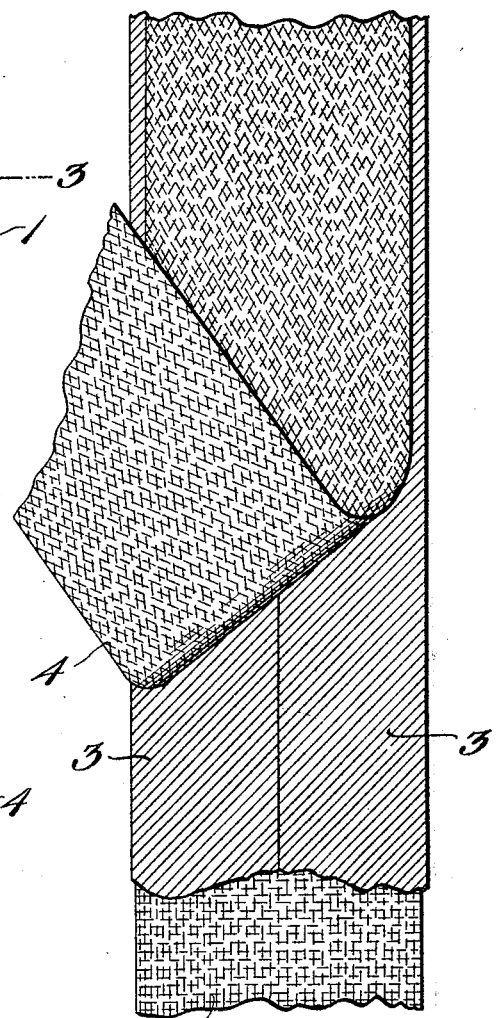
Fig. 2 is a back view thereof, with the backing strip turned up to show the relations, etc., of the component strips.
Figure 3:
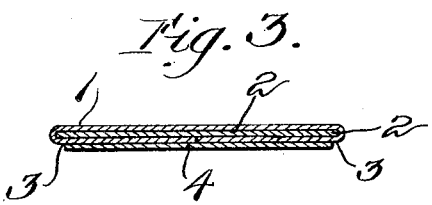
Fig. 3 is a sectional view on line 3, 3, of Fig. 1.

The laminated strip shown in the drawings comprises the three component parts aforesaid, namely a facing strip 1 which ordinarily is the one that is more conspicuously exposed in use, an inelastic lining strip 2, and a backing strip 4. The facing strip 1 is made of any desired material having the requisite characteristics and quality for the use for which the manufactured fabric strip is intended. It may be a narrow webbing with two selvages, woven of suitable width to fit it for use as an element of a fabric constructed according to the invention. Usually, however, I shall employ a strip cut from wide piece goods, the lack of woven selvages being immaterial inasmuch as the raw edges of such a strip will be entirely concealed in the completed fabric. In either case, the facing strip employed is somewhat wider than the finished strip is desired to be. The inelastic lining strip 2 is composed of suitable material to give substance as well as contribute to the strength of the finished fabric, and is of a character to provide for any requisite degree of stiffness and any desired flexibility of the product. The surfaces of the two strips 1 and 2 which contact with each other are united throughout by means of a suitable cement, preferably waterproof, such as rubber solution. In applying the lining strip 2 to the back of facing strip 1 it is so combined therewith as to leave lateral marginal portions 3, 3, of the latter, which are folded inwardly around the side edges of the lining strip and pressed into contact with the back surface of such strip, to which surface the said inwardly folded marginal portions are united by the cement. The edges of the said marginal portions are brought together as in Fig. 3. The backing strip 4 is narrower than either of the aforementioned component strips 1 and 2, and for the sake of neatness and strength is preferably, though not necessarily, composed of tape or webbing having selvage edges. It is secured by means of cement against the inturned or marginal portions 3, 3, of the facing strip 1, with its edges slightly inward of the fold-lines where the facing strip bends around the lining strip, and covers and conceals the more or less unsightly meeting-line or joint between the edges of the facing strip, giving a smooth and pleasing aspect to the back of the fabric. The whole fabric then is subjected to pressure to ensure close union throughout of the contacting surfaces. This pressure may be applied by causing the fabric to pass between pressure rolls, or otherwise as found most convenient, care being exercised to apply pressure sufficient to insure the contiguous surfaces of the several plies being pressed into intimate contact.

The resulting laminated fabric may have conferred upon it any required degree of strength combined with flexibility, and any required degree of lateral stiffness. The manner of construction set forth makes it possible to manufacture cheaply and easily with inexpensive equipment a large variety of fabric strips. Material of almost any kind, quality, texture, and pattern or design may be utilized at will for the facing strip and backing strip of the combination; and the lining strip may be varied as indicated hereinbefore.

What is claimed as the invention is,—

1. A narrow inelastic laminated fabric adapted for use in suspenders or the like comprising an inelastic lining strip, a facing strip cemented to one surface of said inelastic lining strip and having its marginal portions folded inward around the edges of the lining strip and cemented to the other surface of the lining strip, and a backing strip cemented upon the said marginal portions of the facing strip and constituting a continuous surfacing.

2. A narrow inelastic laminated fabric adapted for use in suspenders or the like comprising a facing strip, an inelastic lining strip enclosed by the inwardly folded lateral margins of the facing strip, and a backing strip narrower than said combined strips applied exteriorly to the said inwardly folded margins of the facing strip and constituting a continuous surfacing, with the surfaces of the strips cemented together at all points of contact.

3. A narrow inelastic laminated fabric adapted for use in suspenders and the like, comprising a woven fabric facing strip, an inelastic fabric lining strip enclosed by the inwardly-folded lateral margins of the facing strip, and a woven fabric backing strip applied to the outside surfaces of the inwardly-folded margins of the facing strip, concealing the edges of the latter, with its margins inward of the fold-lines of the facing strip.

WILLIAM C. FISHER.